United States Patent
Green et al.

(10) Patent No.: US 11,106,770 B2
(45) Date of Patent: Aug. 31, 2021

(54) MULTI-FACTOR AUTHORIZATION DETECTION AND PASSWORD STORAGE SYSTEM

(71) Applicant: International Business Machines Corporation, Armonk, NY (US)

(72) Inventors: Sophie Green, Surrey (GB); David James Nice, Southampton (GB); Ledina Hido-Evans, Winchester (GB); Stewart Oliver Maslen Francis, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 16/250,396

(22) Filed: Jan. 17, 2019

(65) Prior Publication Data
US 2020/0233939 A1    Jul. 23, 2020

(51) Int. Cl.
G06F 21/31    (2013.01)
G06F 21/45    (2013.01)
G06F 21/41    (2013.01)
G06F 21/40    (2013.01)

(52) U.S. Cl.
CPC .......... *G06F 21/316* (2013.01); *G06F 21/40* (2013.01); *G06F 21/41* (2013.01); *G06F 21/45* (2013.01)

(58) Field of Classification Search
CPC ........ G06F 21/316; G06F 21/40; G06F 21/41; G06F 21/45
See application file for complete search history.

(56) References Cited

U.S. PATENT DOCUMENTS

| | | | |
|---|---|---|---|
| 8,762,356 B1* | 6/2014 | Kogan | G06F 3/023 707/705 |
| 9,064,257 B2 | 6/2015 | Beigi | |
| 9,419,968 B1 | 8/2016 | Pei et al. | |
| 9,686,300 B1 | 6/2017 | Kurupati | |
| 2016/0359838 A1 | 12/2016 | Dasgupta et al. | |
| 2017/0180345 A1* | 6/2017 | Mohan | H04L 63/083 |
| 2018/0004928 A1* | 1/2018 | Hayashi | H04L 63/0861 |
| 2018/0160309 A1* | 6/2018 | Turgeman | H04M 1/72522 |
| 2019/0073457 A1* | 3/2019 | Jiang | G06F 3/0412 |

OTHER PUBLICATIONS

M. Al-Jarrah "A Multi-factor Authentication Scheme using Keystroke Dynamics and Two-part Passwords," International Journal of Academic Research. May 2013, vol. 5 Issue 3 pp. 2.
M. Pramana et al., "Keystroke Dynamics for Authentication Using Dynamic Time Warping," IEEE Xplore Digital Library. Sep. 2017. pp. 3.

* cited by examiner

*Primary Examiner* — Nelson S. Giddins
(74) *Attorney, Agent, or Firm* — Cantor Colburn LLP; Teddi Maranzano

(57) ABSTRACT

Embodiments of the present invention are directed towards a computer-implemented method of detecting multi-factor authorization. The method includes detecting a user entering security credentials for a client application via a keypad. The method further includes determining that the user is using a single sign-on method of authentication method based upon a cadence of keystrokes used to enter the security credentials. The method further includes storing the security credentials in memory.

20 Claims, 5 Drawing Sheets

MULTI-FACTOR AUTHORIZATION DETECTION AND PASSWORD STORAGE SYSTEM

BACKGROUND

The present invention generally relates to password storage technology, and more specifically, to applications that distinguish between single sign-on authorization and multi-factor authorization to determine whether to store a password in system memory.

Client applications are configured to store user login identifications and passwords. Passwords can reside on local hardware within a downloaded client application. Stored passwords can be transmitted automatically to a network server to initiate user authorization. This process adds to the user's convenience by eliminating the time required to re-enter a password from a known computer.

SUMMARY

Embodiments of the present invention are directed to a computer-implemented method for detecting multi-factor authorization. A non-limiting example of the computer-implemented method includes detecting a user entering security credentials for a client application via a keypad. The method further includes determining that the user is using a single sign-on method of authentication based upon a cadence of keystrokes used to enter the security credentials. The method further includes storing the security credentials in memory.

Embodiments of the present invention are directed to a computer system for multi-factor authorization. The computer system includes a memory and a hardware processor system communicatively coupled to the memory. The processor system is configured to perform the computer-implemented method.

Embodiments of the invention are directed to a computer program product for detecting multi-factor authorization, the computer program product comprising a computer readable storage medium having program instructions embodied therewith. The program instructions are executable by a processor to cause the processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
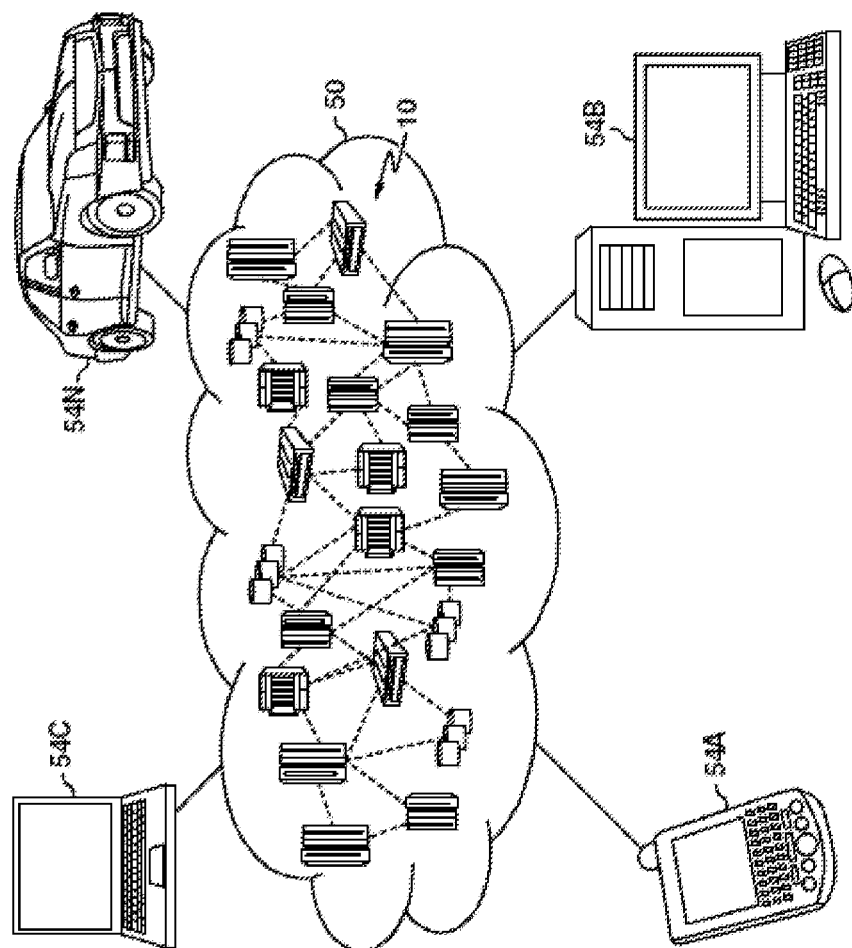
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Mobile computing devices, work from home solutions and bring your own device policies grant employees with greater flexibility in controlling their work schedules. However, along with the greater flexibility comes greater risk for companies to incur data breaches. In conventional systems and applications, users are required to enter a passcode to access the company's network using a single sign-on method. To enhance user efficiency, many software applications introduced password storage features, that store passwords and automatically transmit the passwords to a server for authentication when, for example, a user is accessing an application from a known device.

However, even with password-based security, companies continued to incur data breaches due to poor password protection. To further enhance network security measures, many companies have adopted multi-factor authentication (MFA) protocols, in which users enter two forms of identification in order to access an application or network. In a number of MFA systems, the second set of credentials are one-time passwords (OTPs) generated for a specific instance and expire after use or a period of time. In these instances, software applications should only store the first set of credentials as retransmitting an expired set of set of credentials would only cause an authentication mechanism to deny access to the user.

At times, companies with older systems will adopt MFA-based security protocols to prevent unauthorized data intrusion. However, the network administrators may find it difficult or be unable to introduce separate prompts for the username and security token in these older systems. This can be the result of the application programming interface (API) to the server not being practical to update, or the graphical user interface (GUI) cannot be extended to accommodate entering a separate security token. In these situations, the older systems can type a concatenated password and security token into a single password field on the client side. The client application can then transmit the concatenated credentials to a network server, which then separates the password and token and performs an authentication procedure.

Systems using MFA should not store these concatenated credentials as the one-time password expires. Certain software application prompt users to identify whether they're logging on to an application using a single sign-on or MFA sign-on method. Based upon the user's response, the application can determine whether to store the credentials or not. Other certain software applications separate the password and the security token into separate user interface (UI) elements. However, these applications have to be configured to separate the concatenated credentials correctly. For example, first the password then the security token or first the security token and then the password. In other systems, the server application may distinguish credentials by knowing a length of a one-time password. In yet other systems, the server application may distinguish credentials by traversing a set of credentials to determine if any numeric characters are included.

However, in each of these systems, the users are required to incur an additional step of indicating the type of authentication method they are using to log in, understanding the difference between a single sign-on and an MFA, and the consequences of choosing an incorrect authentication method.

Embodiments of the present invention provide methods and systems for automatically determining whether a user is using a single sign-on authentication method or an MFA method. Based upon the determination, a system can determine whether to store a set of credentials without notifying a server which authentication method is being used. In the herein-described methods and systems, the client application does not need to recognize whether a server is expecting concatenated credentials or expect a predetermined length of the first credentials or second credentials.

Turning now to an overview of technologies that are more specifically relevant to aspects of the invention. Multi-factor authentication (MFA) is a security method used to confirm the identity of a user to prevent unauthorized access to an application, terminals, networks, and servers. MFA offers increased security from single sign-on systems and can be used by corporations and individuals to protect against data breaches. The process includes requiring a user to present two pieces of evidence or credentials that confirm the user's identity and authority to access an account. Credentials can be presented to an authenticating mechanism in a network server and be in the form of multiple categories. One category is any knowledge specific to the user. For example, the credentials could include a passcode, an answer to a security question, or a pin code. Another category is an object in the user's possession. For example, the object could be an ATM card, a debit card, or a key fob. Another category is credentials that are inherently associated with the user. For example, the credentials could be a fingerprint, an iris scan, a voice sample, or other biometric signals. Yet another category can be a connecting from a specific location or the timing of a connection.

MFA provides secure authentication in part by requiring credentials from different sources. In other words, the source of the first credential should be different than the source of the second credential. For example, both credentials should not be user-generated passcodes or pin codes. If, for example, the credential is a key fob from an employer or building management company, the second credential should be a user-generated passcode or a biometric signal.

The first and second credentials can be from the same category, but originate from different sources. For example, both credentials can be from knowledge specific to the user. A user can enter a primary identification and a passcode associated with the primary identification. The second credential can be a one-time password (OTP) generated by a security token. The OTP can be any combination of numbers, letters, and symbols in the form of a passcode or pin code. The OTP can be generated by a hardware token, for example, a keyring device or smart card that has an OPT generator. The OTP can also be generated by a software token embedded into a smartphone, tablet, personal computer, or another computing device. Once entered, the first credentials and the second credentials are transmitted to an authentication mechanism to verify the credentials and either permit or restrict the user's access to the application, network, or server.

Keystroke dynamics or keystroke biometrics are patterns in the rhythm and timing found in typing on a keyboard. Keystroke dynamics can be used to detect the words or characters typed per minute. Typing errors commonly made by a user can also be identified. Variations in the typing speed between characters can be detected. Keystroke dynamics can be used to detect the time between when a key is depressed, the time the key is released, and a subsequent key is depressed. The variations in speed, errors, and timing can also be analyzed in terms of times of day, days of the week, and periods during a year.

In one instance, keystroke dynamics can be used to detect a cadence of a user's keystroke typing. A time interval difference can be detected between releasing a key and pressing a subsequent key to form a single character string and a pause between separate character strings. In the context of MFA, the herein described system can detect timing differences between keystroke types in order to predict between a single sign-on system and an MFA system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
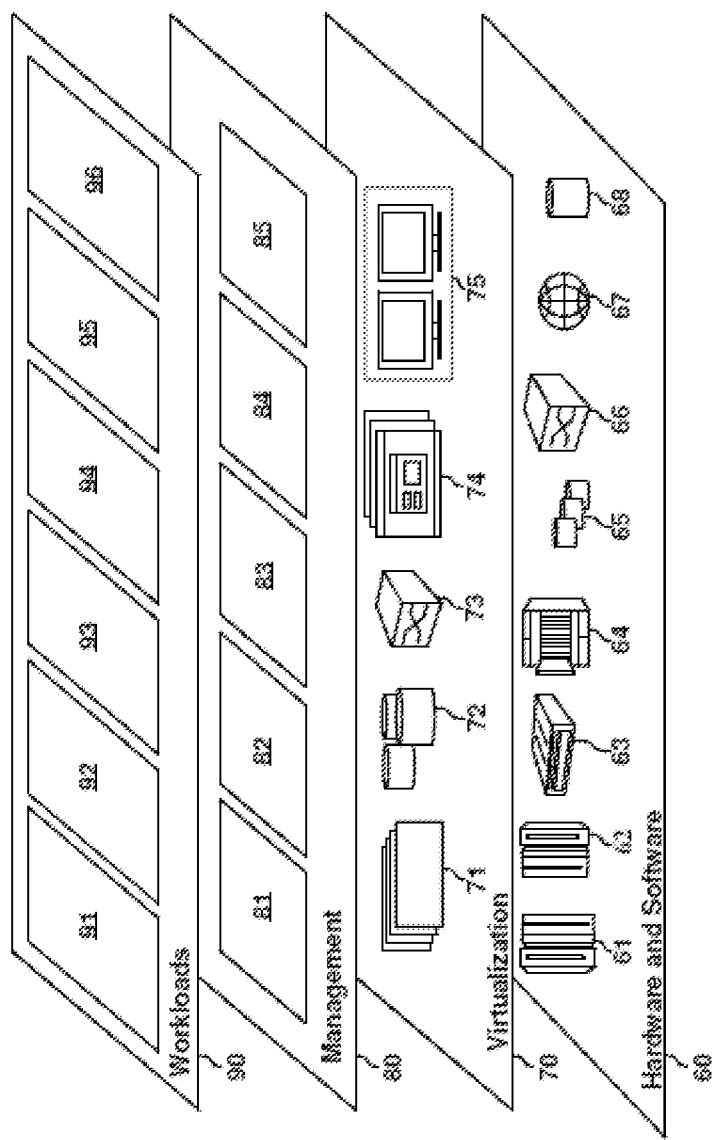
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authenticating credentials during a user login process 96.

Figure 3:
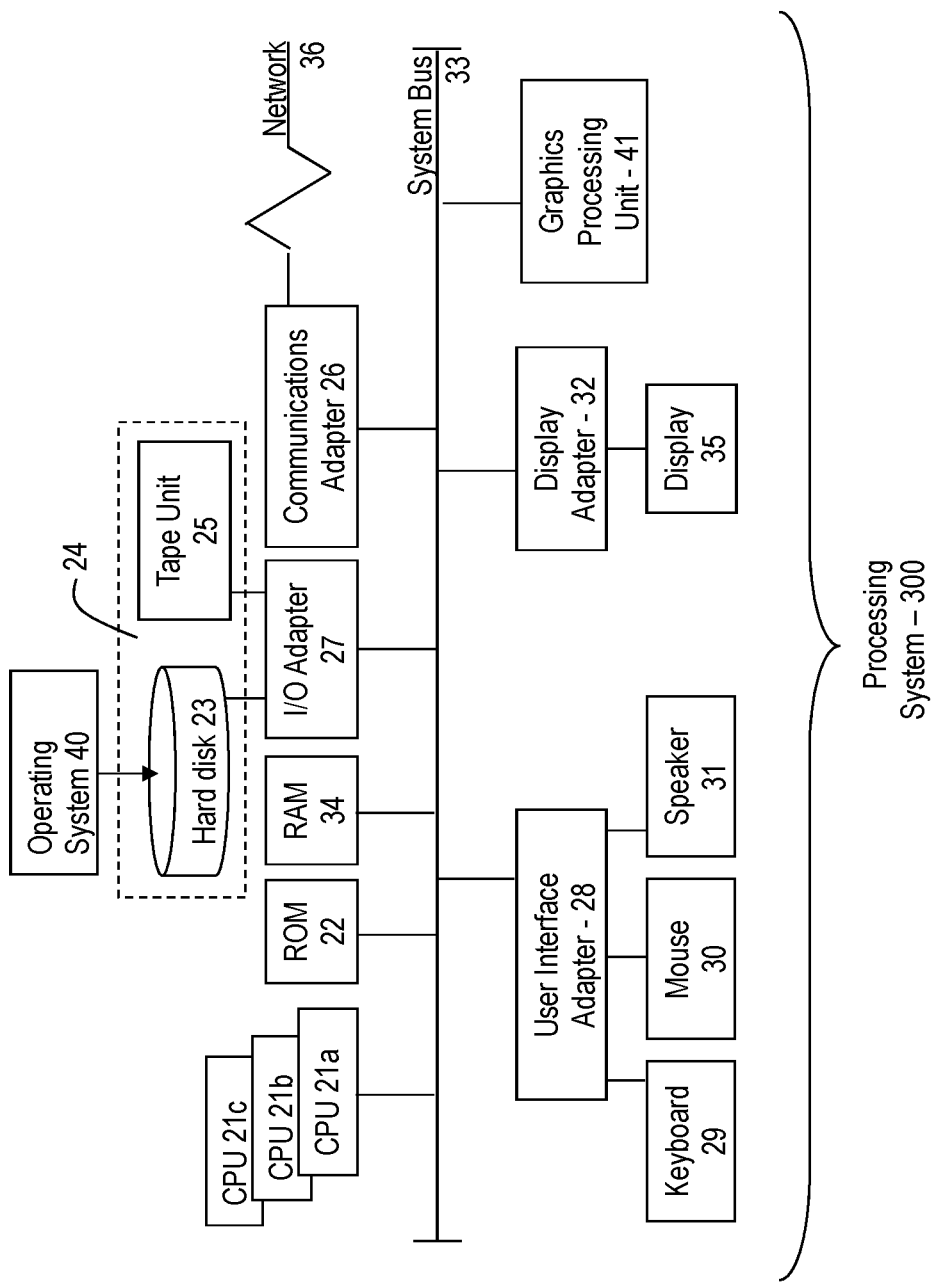
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21*a*, 21*b*, 21*c*, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of the aspects of the invention, one or more embodiments of the invention address the above-described shortcomings of the prior art by providing methods and systems that analyze keyboard typing to distinguish between a single single-on method authentication and an MFA authentication method. Once the client application determines the method, the client application can distinguish between a first credential and a one-time password and store only the first credentials. It should be appreciated that the client application includes any number of software applications including web browsers, commercial software solutions, e-commerce software, or other software.

The above-described aspects of the invention address the shortcomings of the prior art by providing a system providing a method for a client application to distinguish credentials without a server having any pre-existing knowledge of the character of the credentials, a length of the credentials, traversing the credentials to determine if any numeric characters are included.

Figure 4:
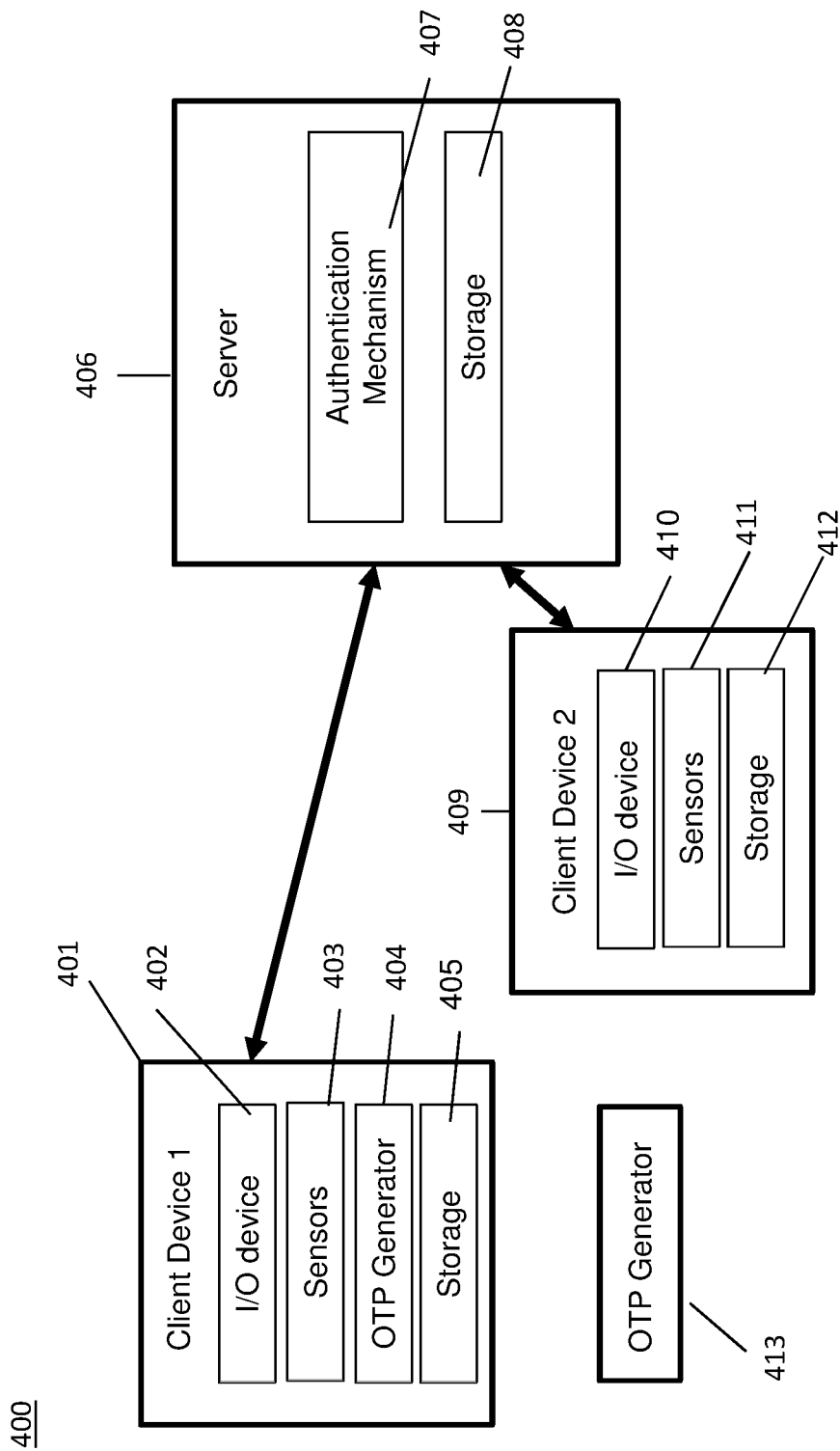
FIG. 4 depicts a block diagram of a system for use in implementing one or more embodiments of the present invention.

Turning now to a more detailed description of aspects of the present invention, FIG. 4 depicts a system 400 for enacting the herein described methods according to embodiments of the invention. Client Device 1 401 is connected via a communications network (not shown) to a server 406. The communications network can be a communications port, a wired transceiver, a wireless transceiver, and/or a network card. The communications network can communicate using technologies such as Ethernet, fiber optics, microwave, xDSL (Digital Subscriber Line), Wireless Local Area Network (WLAN) technology, wireless cellular technology, BLUETOOTH technology and/or any other appropriate technology.

Client device 1 401 includes an I/O device 402 for inputting first credentials and second credentials. The I/O device 402 can be a keyboard, a mouse. Additionally, the I/O device 402 can be internal to the client device, for example, a touchscreen display with a keyboard or the I/O device 402 can be an external device such a physical keyboard. Client device 1 401 equipped with sensors for sensing a timing of entering inputs. The sensors can include one of or a combination of pressure sensing transducer, capacitive sensors, thermal transducers, biometric sensors including an image capturing device for capturing an image of a user, or any other appropriate sensors. Client device 1 401 also includes an OTP generator for generating a one-time password. This OTP can be entered by a user to authenticate identity when requesting access to a network.

Client device 1 401 also includes storage for storing credentials. The storage 405 can include a device such as a Dynamic Random Access Memory (DRAM), Static RAM (SRAM), or other RAM or a flash memory. The storage 405 can be or include a hard disk, a magneto-optical medium, an optical medium such as a CD-ROM, a digital versatile disk (DVDs), or Blu-ray disc (BD), or other type of device for electronic data storage. The storage 405 can include cache memory, system memory, or a combination thereof.

Client devices 1 and 2 401 409 can include one or more processors, a display and any other hardware or software described in FIGS. 1-3, including configuration, to perform analogous functionality to that described herein. The processor can receive data from the sensors 403 to make a determination of whether the user is using a single sign-on method or an MFA method. In making its determination, the processor can be configured to analyze a length of the credentials, a user's fluency of entering the credentials, and a user's cadence of entering the credentials. The fluency is related to an overall speed of entering the credentials. If, for example, the user enters the credentials in an overall short period of time and without any undue pauses, client device 1 401 can assume that the user is using a single sign-on method. When analyzing the cadence, the processor can detect the individual time intervals between releasing a key and entering a subsequent key. If the cadence analysis detects an unduly long-time interval between two portions of the credentials, client device 1, can assume that the user is using an MFA. On the other hand, an average time interval between key inputs being substantially similar indicates that the user is comfortable with the credentials and using a single sign-on method. A pause indicates a user may be receiving an OTP and is unfamiliar with the characters and therefore pauses to review the OTP prior to entering the characters.

As described earlier, client device 1 401 is connected to a server 406. The server 406 includes an authentication mechanism 407 and storage 408. The authentication mechanism can authenticate a user's credentials by comparing stored credentials with credentials transmitted from a client device. The authentication mechanism can also authenticate the OTP by generating a duplicate OTP or various other methods.

Client device 2 409 can be configured similarly to client device 1 401. As seen in FIG. 4, client device 2 409 includes an I/O device 410, sensors 411, and storage 412. Client device 2 409 is coupled with an external OTP generator 413 that generates the OTP. The external OTP generator 413 functions similarly to the internal OTP generator 404, however, is housed in a separate housing as client device 2 409.

Figure 5:
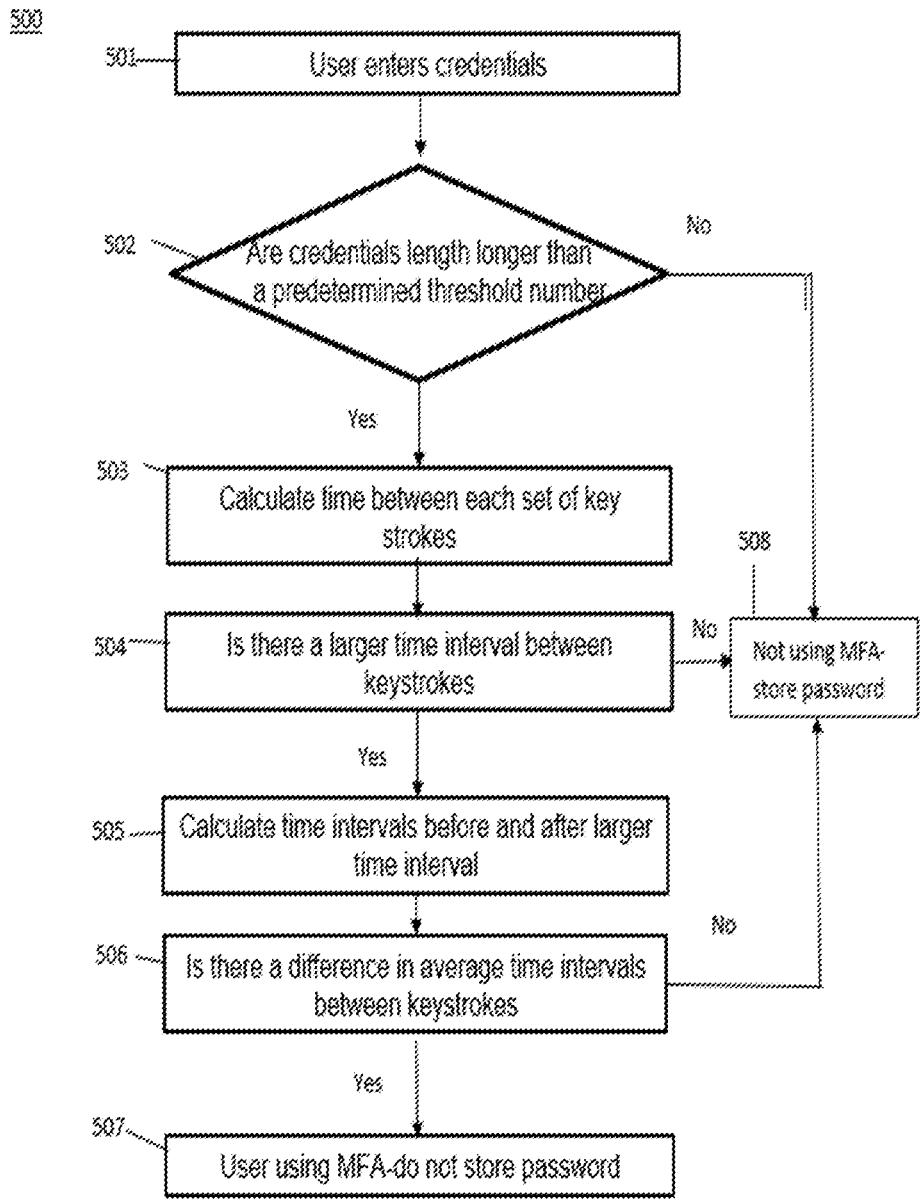
FIG. 5 depicts a flow diagram of a method for detecting multi-factor authorization according to one or more embodiments of the invention.

FIG. 5 depicts a flow diagram of a method for determining whether a user is using an MFA method, according to one or more embodiments of the invention. The method 500 includes detecting that a user has entered credentials using a client application into a computing device 501. The client application determines the number of characters included in the credentials 502. If the number of characters is below a threshold amount, the system assumes that the user is using a single sign-on method. The system can then initiate a prompt asking the user if he or she desires to save the credentials and then store the password as requested 508. If, however, the number of characters is above a threshold value, the client application calculates a time interval between keystrokes 503. This includes a time interval between individual keystrokes and an overall interval between a first and last keystroke.

When users pause to check an OTP generator, the user's typing cadence will pause. Additionally, due to unfamiliarity with an OTP, the time intervals between keystrokes after the pause will be on average greater than time intervals before the pause. In some instances, the system may detect that the portion after the paused was entered nearly instantaneously. This suggests that a user cut and paste an OPT to the password field. To determine if a pause has occurred, the system looks for a change in the typing cadence 504. If no pause is indicated, the system assumes that the user is using a single sign-on method and can request whether to store the password. If, however, the system detects a time interval that is a threshold amount longer than a previous time interval, the system can assume a pause has occurred.

The system calculates the time intervals between keystrokes for a first portion before the pause and a second portion after the pause 505. The system then determines whether there is a difference in time intervals of the first portion and second portion 506. It should be appreciated that determining whether there is a difference can be accomplished by various statistical methods. The determination that a difference exists can be based upon an average time interval of the second portion being greater than an average time interval of the first portion. The difference can also be based on the time interval between keystrokes of the second portion being near instantaneous suggesting cutting and pasting by a user. If there is a difference, this suggests the user is using an MFA method and the system will not prompt a user as to whether a password should be stored 507. If there no difference between a larger time interval, then this suggests the user is using a single sign-on method and the system sends a prompt requesting permission to store the password. For example, the time intervals in the first portion may be within a threshold range of the time intervals of the second portion.

The system can also evaluate the fluency of the user's typing by calculating an overall time to enter the entire set of characters. If the overall time interval is less than some predetermined amount, the short time interval suggests familiarity with the credentials and that the user is using a single sign-on method.

Stored credentials can be automatically transmitted to a server when the client application detects the user has re-engaged the application. Thereby, providing a more convenient method of storage and transmission of credentials.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for multi-factor authentication detection, the method comprising:
 detecting a user is entering security credentials for engaging a client application via a keypad;

determining which of a single sign-on method for authentication or multi-factor method for authentication that the user is using based upon a cadence of keystrokes used to enter the security credentials; and storing the security credentials in memory based on the determination of which of the single sign-on method or multi-factor method the user is using.

2. The computer-implemented method of claim 1, wherein determining which of the single sign-on method or multi-factor method that the user is using comprises:
   calculating a time interval between respective keystrokes;
   detecting a calculated time interval being a threshold time greater than a previous time interval;
   calculating an average time interval between keystrokes entered before the greater time interval and keystrokes entered after the greater time interval; and
   determining that the user is using the single sign-on method based on the average time interval of the keystrokes entered after the greater time interval is within a threshold range of the average time interval of the keystrokes entered before the greater time interval.

3. The computer-implemented method of claim 1, wherein the method further comprises determining which of the single sign-on method or multi-factor method that the user is using is further based on a fluency of the keystrokes.

4. The computer-implemented method of claim 3, wherein determining which of the single sign-on method or multi-factor method that the user is using further comprises:
   calculating an overall time interval between a first keystroke and a last keystroke; and
   determining that the overall time interval is lesser than a threshold time interval.

5. The computer-implement method of claim 1, further comprising determining that a length of the security credentials is greater than a threshold value.

6. The computer-implement method of claim 1, further comprising directing a prompt to the user on whether to store the security credentials in memory.

7. The computer-implemented method of claim 1, further comprising automatically transmitting the stored security credentials to a client server upon detecting the user has reengaged the client application.

8. A system for multi-factor authentication detection, the system comprising:
   a processor communicatively coupled to a memory, the processor configured to:
   detect a user is entering security credentials for engaging a client application via a keypad;
   determine which of a single sign-on method for authentication or multi-factor method for authentication that the user is using a single sign on method of authentication method based upon a cadence of keystrokes used to enter the security credentials; and
   store the security credentials in memory based on the determination of which of the single sign-on method or multi-factor method the user is using.

9. The system of claim 8, wherein determining which of the single sign-on authentication method or multi-factor authentication method that the user is using comprises:
   calculating a time interval between respective keystrokes;
   detecting a calculated time interval being a threshold time greater than a previous time interval;
   calculating an average time interval between keystrokes entered before the greater time interval and keystrokes entered after the greater time interval; and
   determining that the user is using the single sign-on method based on the average time interval of the keystrokes entered after the greater time interval is within a threshold range of the average time interval of the keystrokes entered before the greater time interval.

10. The system of claim 8, wherein the processor is further configured to determine which of the single sign-on method or multi-factor method that the user is using based on a fluency of the keystrokes.

11. The system of claim 10, wherein determining which of the single sign-on method or multi-factor method that the user is using further comprises:
   calculating an overall time interval between a first keystroke and a last keystroke; and
   determining that the overall time interval is lesser than a threshold time interval.

12. The system of claim 8, wherein the processor is further configured to determine that a length of the security credentials is greater than a threshold value.

13. The system of claim 8, wherein the processor is further configured to direct a prompt to the user on whether to store the security credentials in memory.

14. The system of claim 8, wherein the processor is further configured to automatically transmit the stored security credentials to a client server upon detecting the user has reengaged the client application.

15. A computer program product for detecting multi-factor authentication, the computer program product comprising a computer readable storage medium having program instructions embodied therewith, the instructions executable by a processor to cause the processor to:
   detect a user is entering security credentials for engaging a client application via a keypad;
   determine which of a single sign-on method for authentication or multi-factor method for authentication that the user is using based upon a cadence of keystrokes used to enter the security credentials; and
   store the security credentials in memory based on the determination of which of the single sign-on method or multi-factor method the user is using.

16. The computer program product of claim 15, wherein determining which of the single sign-on method or multi-factor method that the user is using comprises:
   calculating a time interval between respective keystrokes;
   detecting a calculated time interval being a threshold time greater than a previous time interval;
   calculating an average time interval between keystrokes entered before the greater time interval and keystrokes entered after the greater time interval; and
   determining that the user is using the single sign-on method based on the average time interval of the keystrokes entered after the greater time interval is within a threshold range of the average time interval of the keystrokes entered before the greater time interval.

17. The computer program product of claim 15, wherein the processor is further configured to determine which of the single sign-on method or multi-factor method that the user is using based on a fluency of the keystrokes.

18. The computer program product of claim 17, wherein determining which of the single sign-on method or multi-factor method that the user is using the single sign-on method further comprises:
   calculating an overall time interval between a first keystroke and a last keystroke; and
   determining that the overall time interval is lesser than a threshold time interval.

19. The computer program product of claim 15, wherein the processor is further configured to determine that a length of the security credentials is greater than a threshold value.

20. The computer program product of claim 15, wherein the processor is further configured to direct a prompt to the user on whether to store the security credentials in memory.

\* \* \* \* \*